Dec. 10, 1935.    S. S. LAUGHLIN    2,023,689
CLUTCH
Filed Sept. 13, 1934
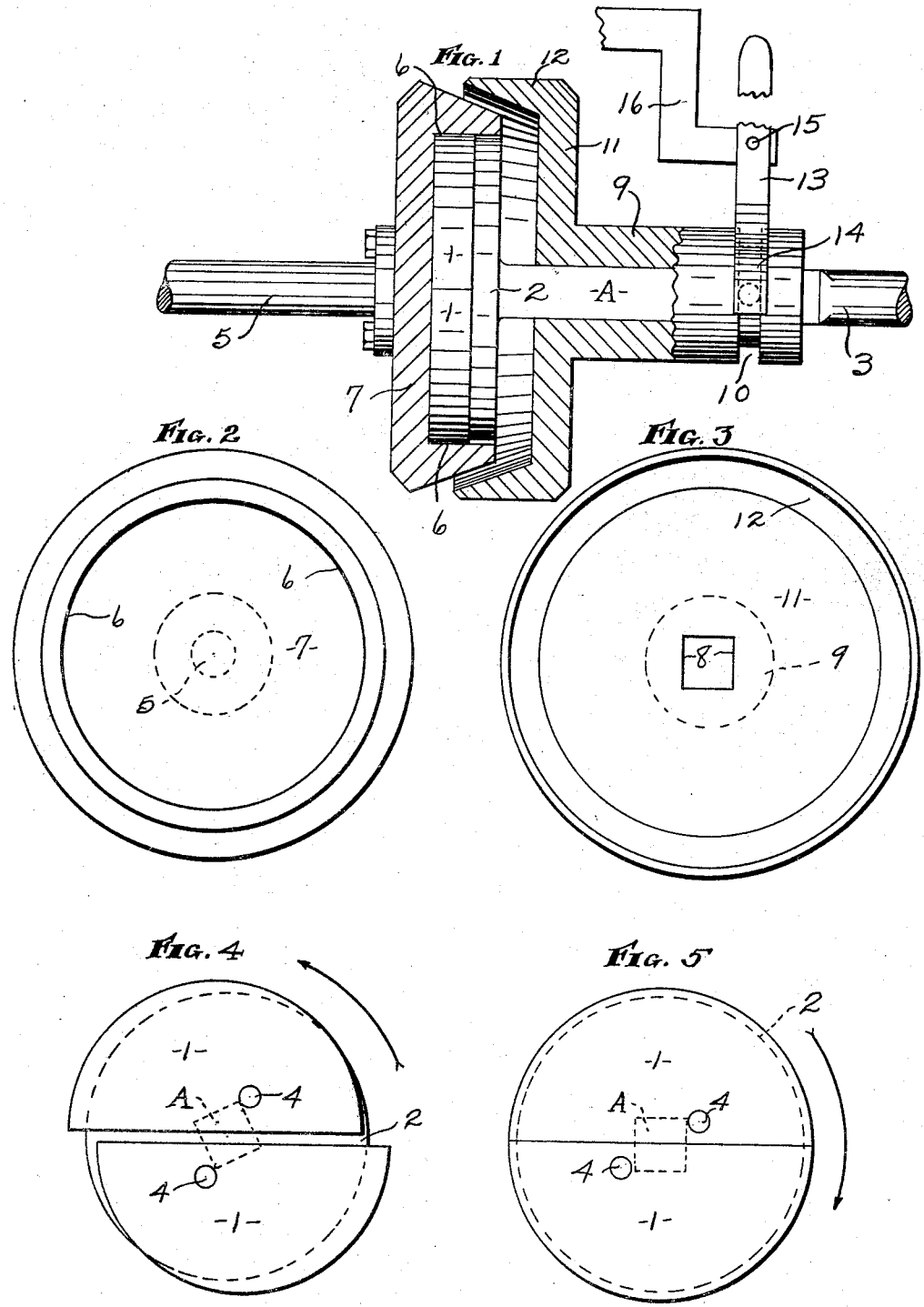
INVENTOR.
SIMON S. LAUGHLIN
BY U.G. Charles
ATTORNEY.

Patented Dec. 10, 1935

2,023,689

UNITED STATES PATENT OFFICE 2,023,689

CLUTCH

Simon S. Laughlin, Wichita, Kans.

Application September 13, 1934, Serial No. 743,790

2 Claims. (Cl. 192—41)

My invention relates to improvements in a clutch.

The object of my invention is to provide a clutch frictionally engaging.

A further object of my invention is to provide friction engaging elements actuated by the drive shaft.

A still further object of my invention is to provide a friction clutch centrally divided, and means to expand the members from a common center for peripheral engagement.

A still further object of my invention is to provide a friction clutch that will engage only in one direction of rotation and release in the other direction.

A still further object of my invention is to provide an auxiliary clutch co-operating therewith at the option of the operator.

These and other objects will hereinafter be more fully explained, reference being had to the accompanying drawing forming a part of this specification, and in which like characters will apply to like parts in the different views.

Referring to the drawing.

Fig. 1 is a side view of the clutch, partly in section for convenience of illustration.

Fig. 2 is an inside view of the driven housing of the clutch.

Fig. 3 is an inside view of the auxiliary clutch member.

Fig. 4 is a plan view of the friction elements expanded.

Fig. 5 is a plan view of the friction elements contracted.

My invention herein disclosed consists of two semi-circular elements 1 and a disc 2 that is rigidly secured to a drive shaft 3 and rotatable therewith. Secured to the disc and outwardly extending from the side thereof is a pair of pins 4, which are eccentrically and oppositely positioned with respect to the diametrical axis of the disc. The said semi-circular elements are apertured to rockably engage on their respective pins to move the said elements from each other when the said disc is turned in the direction shown by the arrow in Fig. 4, and when the said disc is turned in the direction of the arrow as shown in Fig. 5 the said semi-circular elements are moved toward each other to peripheral registry and in parallelism with the periphery of the disc, by which means expansion and contraction of the semi-circular elements are accomplished.

Axially aligned with the drive shaft 3 is a shaft 5 that is subject to being driven by expansion of the semi-circular elements for frictional engagement peripherally upon the inside annular wall 6 of a head 7 secured to the said shaft 5 and rotatable therewith.

It will be understood that the said pins 4 are arranged to carry the load imposed by the drive shaft upon the semi-circular discs when the latter are brought to frictional engagement as above stated, transmitting the power to the shaft driven thereby.

It is now clearly shown how the expansion of the semi-circular members will cause frictional engagement with the annular wall in which they are housed carrying the same in rotation therewith and will automatically release should the said drive shaft 3 be stopped from rotation, and the other shaft 5 continues to rotate.

A portion of the shaft adjacent the disc 2 is square as at A to engage with a smooth sliding fit in a corresponding opening 8 in the center of the auxiliary clutch element comprising a sleeve 9 with an annular groove 10 on the outer end thereof, and a head 11 having an annular flange 12, the inside wall of which diverges outward coinciding with the outside wall of the flange of the head 7, by which arrangement a conical frictional engagement is provided between the said head members 11 and 7.

As a means to engage or disengage the conical friction clutch, I have arranged a lever 13 having a yoke 14 to engage in the groove 10, the lever pivotally engaging as at 15 on a suitable bearing 16 fragmentarily shown.

The said auxiliary clutch arrangement will function as a brake against momentum of the driven shaft when engaged; the latter mentioned possibility will exist when placed on the power driving or driven shaft of a motor driven vehicle. Furthermore, a clutch so arranged excluding the auxiliary feature will function similar to that of a ratchet as the method of engagement tends to actuate the driven shaft as worked reciprocatingly in its rotation.

The latter method of application is convenient for a wrench, a brace for boring bits, or any mechanisms where complete rotation of the driving element is barred requiring short reciprocating movements to turn the driven element in one continuous direction, and such other applications and modifications may be employed as lie within the scope of the appended claims, and having fully described my invention, what I claim as new and desire to secure by Letters Patent is:—

1. In a clutch, in combination with a drive and a driven shaft, the driven shaft having a head with an annular wall outwardly extending from the side thereof, the drive shaft having a disc to loosely engage in the wall of the head, a pair of semi-circular discs and means to eccentrically and rockably carry each on the side of the disc secured to the drive shaft, the said semi-circular discs to loosely engage in the said wall when rocked to peripheral registry with each other and caused to engage with the wall when moved from each other as turning means for the driven shaft.

2. In a clutch, a drive shaft and a driven shaft, a head having an annular wall at right angle thereto, the said head rigidly secured to the driven shaft, a disc secured to the drive shaft and rotatable therewith and positioned within the flange of the head near the outer end thereof, a pair of pins spaced apart on the diametrical axis of the disc there being one of said pins on each side and equally spaced from the center thereof, a semi-circular disc apertured to engage on each of the pins and rockable thereon, the last said disc to register peripherally with the first said disc when rocked to engagement on the diametrical axis when the drive shaft is turned in one direction, and separated when the drive shaft is turned in the other direction, by which means the peripheral edges of the said semi-circular discs are caused to engage and disengage with the wall of the head, all as and for the purpose specified.

SIMON S. LAUGHLIN.